United States Patent
Lee

(10) Patent No.: US 10,075,826 B2
(45) Date of Patent: Sep. 11, 2018

(54) USER PROTECTION METHOD USING SMART PHONE CASE

(71) Applicant: 247KOREA, Busan (KR)

(72) Inventor: Hwajung Lee, Busan (KR)

(73) Assignee: 247KOREA, Busan (KR)

( * ) Notice: Subject to any disclaimer, the term of this patent is extended or adjusted under 35 U.S.C. 154(b) by 0 days.

(21) Appl. No.: 14/942,099

(22) Filed: Nov. 16, 2015

(65) Prior Publication Data

US 2016/0323727 A1 Nov. 3, 2016

(30) Foreign Application Priority Data

Apr. 30, 2015 (KR) .......................... 10-2015-0061178

(51) Int. Cl.
| | | |
|---|---|---|
| *H04W 76/50* | (2018.01) | |
| *H04W 4/22* | (2009.01) | |
| *H04B 1/3888* | (2015.01) | |
| *H04W 4/90* | (2018.01) | |

(52) U.S. Cl.
CPC ............ *H04W 4/22* (2013.01); *H04B 1/3888* (2013.01); *H04W 4/90* (2018.02); *H04W 76/50* (2018.02)

(58) Field of Classification Search
CPC ...... H04W 4/90; G08B 25/016; H04M 1/185; H04M 1/72536; H04M 1/0254; H04B 1/3888; A45C 2011/002
See application file for complete search history.

(56) References Cited

U.S. PATENT DOCUMENTS

| | | | | |
|---|---|---|---|---|
| 2004/0101112 | A1* | 5/2004 | Kuo ........................ | H04M 1/67 379/88.01 |
| 2005/0034593 | A1* | 2/2005 | LeBourgeois ...... | F41H 13/0031 89/1.11 |
| 2007/0293186 | A1* | 12/2007 | Lehmann ......... | G08B 13/19621 455/404.2 |
| 2009/0158423 | A1* | 6/2009 | Orlassino ............... | G06F 21/32 726/19 |
| 2010/0190468 | A1* | 7/2010 | Scott ................... | H04M 1/2745 455/404.2 |
| 2011/0046920 | A1* | 2/2011 | Amis ..................... | G01S 19/16 702/181 |

(Continued)

Primary Examiner — Kathy Wang-Hurst
Assistant Examiner — Ernest Tacsik
(74) Attorney, Agent, or Firm — Muncy, Geissler, Olds & Lowe, P.C.

(57) ABSTRACT

A user protection method using a smart phone case includes: installing a screen-lock application driven with electric signals of at least one of a fingerprint recognition sensor and the case of the smart phone and a reporting application running in conjunction with the screen-lock application, and setting a predetermined option; unlocking the smart phone and simultaneously running the reporting application, if a registered fingerprint is recognized in the fingerprint recognition sensor or if the smart phone receives an electric signal; sending a designated server report data created by capturing and recording a field situation through a camera and microphone of the smart phone that work in conjunction with the reporting application; and linking report data to a predetermined website, converting an address of the website and position information of the smart phone into text message formats, and sending the conversion results to a guardian's smart phone.

8 Claims, 7 Drawing Sheets

(56) References Cited

U.S. PATENT DOCUMENTS

| | | | |
|---|---|---|---|
| 2011/0069676 A1* | 3/2011 | Perras | H04W 60/02 370/331 |
| 2012/0102332 A1* | 4/2012 | Mullin | G06F 1/1626 713/186 |
| 2012/0142305 A1* | 6/2012 | Lane | H04N 7/18 455/404.1 |
| 2013/0271264 A1* | 10/2013 | Page | G08B 1/08 340/6.1 |
| 2013/0279065 A1* | 10/2013 | Froom | F41H 13/0018 361/232 |
| 2014/0215496 A1* | 7/2014 | Sexton | G06F 3/048 719/318 |
| 2014/0333831 A1* | 11/2014 | Oh | H04N 5/2254 348/376 |
| 2015/0147997 A1* | 5/2015 | Shaw | G06F 21/554 455/404.2 |

* cited by examiner

USER PROTECTION METHOD USING SMART PHONE CASE

BACKGROUND OF THE INVENTION

Field of the Invention

The present invention relates to a user protection method using a smart phone case and, more particularly, to a user protection method using a smart phone case for automatically calling for rescue and protecting and defending the user who carries the smart phone from threats to the user in an emergency situation.

Description of Related Art

Generally, mobile devices feature wireless communication capabilities, and may perform various value-added services using the wireless communication function.

For example, among the value-added services there may be a function to measure and track the position of a mobile device, and the method for tracking the position of the mobile device may be performed by the mobile device itself or by a base station.

In the case that the mobile device is to measure its own position, the mobile device may be equipped with a Global Positioning System (GPS) to determine its position with signals received from GPS satellites.

In the case that a base station is to track the position of the mobile device, multiple base stations may receive pilot signals transmitted from the mobile device and determine the position of the mobile device using triangulation.

Such a method for locating a mobile device using the GPS or the base station must be used in position tracking and tracing services. For example, students on their home from school, working women on their way home from their workplaces, or elderly people may be likely to be exposed to accidents or crimes, in which case the position tracking and tracing service of their mobile devices may be used to declare their emergency situations.

Examining the method for processing emergency relief messages in portable terminal with reference to FIG. 1, the method is implemented by a system including a portable terminal 70 that contains an emergency relief message in a text message format and sends out the message once the user has pressed an emergency relief button 73, and an emergency relief center server 72 that tracks the position of the portable terminal 70 upon reception of the emergency relief message from the portable terminal 70 through a base station 71 located on the transmission path of the message and instructs an emergency relief activity.

In the conventional operation of the portable terminal for emergency relief, the user of the portable terminal first sets an emergency relief message in a text message format in his/her terminal at a non-emergency time. After the emergency relief message is set, if the user of the portable terminal happens to be in danger and needs emergency relief assistance, the user has only to press the emergency relief button on the portable terminal. Once the emergency relief button is pressed, the portable terminal automatically sends the stored emergency relief message to the emergency relief center server via the base station. Accordingly, upon reception of the emergency relief message from a portable terminal, the emergency relief center server tracks the position of the portable terminal through a base station located on the transmission path of the message and carries out proper emergency relief assistance.

However, in the conventional method for processing emergency relief messages from a portable terminal, the user who is in danger must press the emergency relief button to request emergency relief from an emergency relief center, but it may be very difficult for the user to press the emergency relief button in an emergency situation, or the user cannot make the emergency relief request at all when he or she is involved in an accident or is being victimized in a crime.

Moreover, if the user inadvertently presses the emergency relief button while carrying the portable terminal in his/her pocket or bag, the emergency relief call may possibly be received by an associated agency, thereby causing unnecessary mobilization even if the user is not in an emergency situation.

In this regard, in reality it is hard for an emergency assistance agency to provide assistance because it is difficult to determine based on text message alone whether the emergency relief call is genuine. Furthermore, real-time communications between agencies are not being adequately carried out, thereby hampering swift emergency assistance response and failing to prevent collateral damage to a victim who is already in an emergency situation.

Recently, many smart phones applications have been developed to assist in an emergency situation, but running these applications in an actual emergency situation requires multi-stage data entry or touching of the device and thus, even if the place under an emergency situation is known, the spot may not be accessed timely.

SUMMARY OF THE INVENTION

Accordingly, the present invention has been made keeping in mind the above problems occurring in the prior art, and an object of the present invention is to provide a user protection method using a smart phone case for automatically calling for rescue and protecting and defending the user who carries the smart phone from threats in an emergency situation without performing a noticeable behavior or multi-stage operation.

Another object of the present invention is to provide a user protection method using a smart phone case, which minimizes inadvertent rescue calls being reported in non-emergency situations, and prevents unnecessary mobilization of rescue personnel even when an inadvertent rescue call is received by an emergency assistance agency, by reliably determining whether the rescue call is genuine.

In order to accomplish the above object, the present invention provides a user protection method using a smart phone case, the case covering the rear face of the main body of a smart phone to protect the main body from external shocks and being electrically coupled with hardware of the smart phone, and the method using an application that runs based on a preset electric signal to perform at least one of a rescue call function and a self-protection function in an emergency situation to protect a user of the smart phone, the method including: installing a screen-lock application driven with electric signals of at least one of a fingerprint recognition sensor and the case of the smart phone and a reporting application running in conjunction with the screen-lock application, and setting a predetermined option (S200); unlocking the smart phone through the screen-lock application and simultaneously running the reporting application, if a registered fingerprint is recognized in the fingerprint recognition sensor of the smart phone or if the smart phone receives an electric signal generated by the case (S400); sending a designated server report data created by capturing and recording a field situation through a camera and microphone of the smart phone that work in conjunction with the reporting application a designated server (S600); and linking the report data to a predetermined website, converting an address of the website and position information of the smart phone into text message formats, and sending the conversion results to a designated guardian's smart phone, the linking, converting, and sending of results being performed by the server (S800).

The case may be equipped with a self-protection module having at least one self-protection function among a Taser and gas spraying, and if the self-protection module is activated to perform the self-protection function, an electric signal may be generated and sent by the case to the smart phone.

The method may further include registering at least one rescue request voice (S220) by activating a microphone of the smart phone through the option setting (S200) to identifiably record the voice of the user of the smart phone, wherein if the rescue request voice is recognized through the microphone of the smart phone, the smart phone may be unlocked through the screen-lock application regardless of whether the fingerprint was recognized or the electric signal was received, and simultaneously, run the reporting application.

If the reporting application is running (S400), Wi-Fi®, Bluetooth®, Global Positioning System (GPS), and mobile communication data network of the smart phone may be compulsorily executed.

The method may further include sending position information detected using at least one of the Wi-Fi®, Bluetooth®, GPS, and mobile communication data network to the server at regular intervals.

The method may further include: after operation S400, activating the camera and microphone of the smart phone for a certain period of time after the reporting application is activated; and determining whether to stop the reporting application during the certain period of time (S500).

The method may further include, after operation S400, generating a real-time detection signal measured from at least one of an acceleration sensor, a gyro sensor, an illumination sensor, a touch sensor, and an approximation sensor of the smart phone and sending the detection signal to the server through the reporting application (S720); and sending designated terminal time-series pattern data derived by analyzing the real-time detection signal sent to the server (S740).

The method may further include sending an urgent rescue signal based on report data received by the server to a terminal of a call center of a designated private security company or national emergency assistance agency (S900).

Objects of the present invention are not limited thereto, and other objects not mentioned above will be clearly understood from the following description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Advantages, features, and methods for achieving them will be understood more clearly when the following embodiments are read with reference to the accompanying drawings. The embodiments of the invention may, however, be embodied in many different forms and should not be construed as limited to the embodiments set forth herein; rather, these embodiments are provided so that this invention will be thorough and complete, and will fully convey the scope of the embodiments of the invention to those skilled in the art. Terminology as herein used is for describing embodiments of the present invention, and does not intend to limit the present invention. It is to be understood that the singular forms "a", "an", and "the" include plural references unless the context clearly dictates otherwise.

Embodiments of the present invention will now be described with reference to accompanying drawings. In addition, illustrations and descriptions of well-known features, functions and effects may be briefly mentioned or omitted for clarity and conciseness, and the following description will focus on things related to the present invention.

Figure 1:
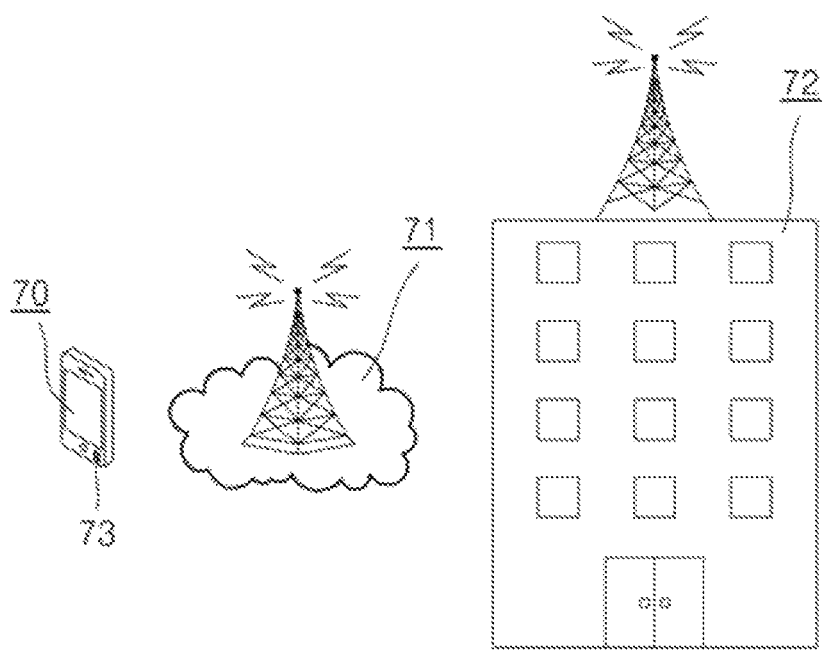
FIG. 1 is a conceptual diagram for explaining a conventional method for processing an emergency relief message of a portable terminal.
Figure 2:
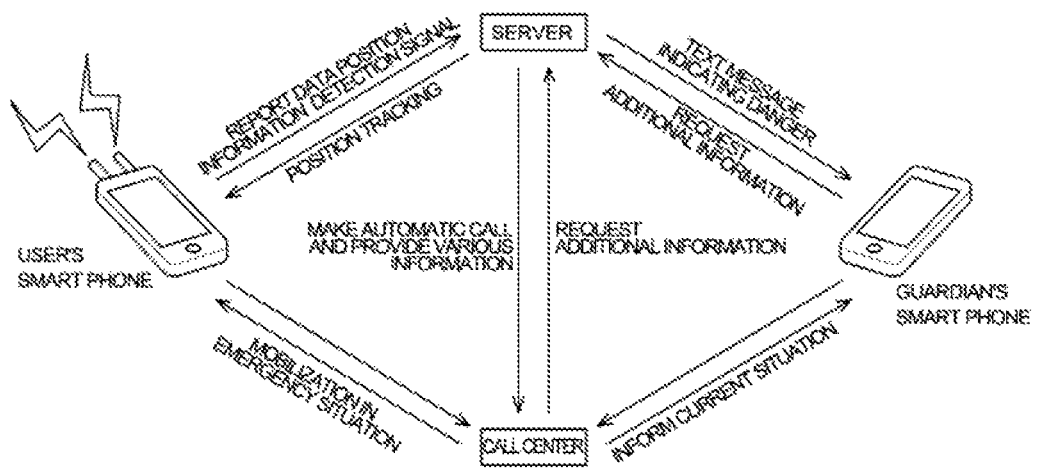
FIG. 2 is a conceptual organization for a user protection method using a smart phone case, according to an embodiment of the present invention.

FIG. 2 is a conceptual organization for a user protection method using a smart phone case, according to an embodiment of the present invention, though which the organization of the method in accordance with the present invention will be schematically understood.

In the present invention, a case covering the rear face of the main body of a smart phone to protect the main body from external shocks is electrically coupled with hardware of the smart phone, and an application running based on a preset electric signal is used to perform at least one of a rescue call function and a self-protection function in an emergency situation to protect the user.

Figure 3:
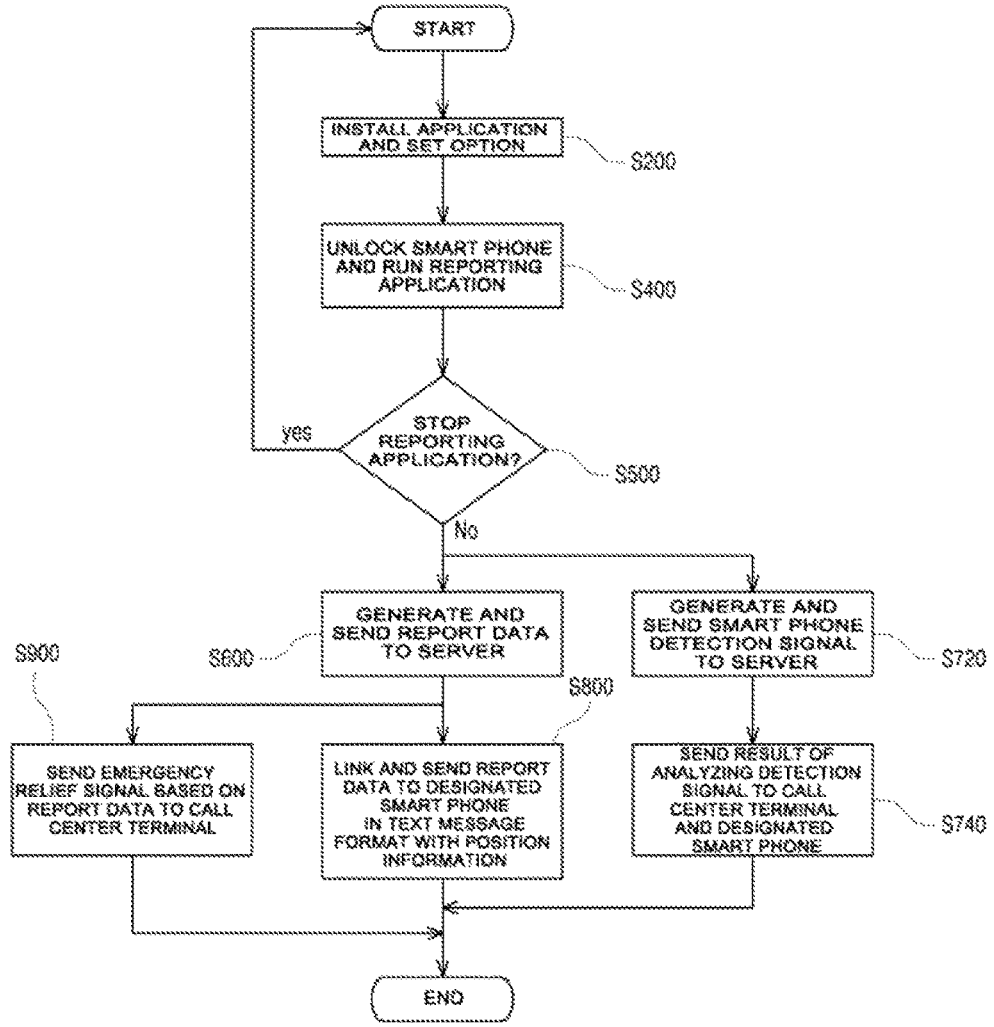
FIG. 3 is a flow chart illustrating a user protection method using a smart phone case, according to an embodiment of the present invention.

FIG. 3 is a flow chart illustrating a user protection method using a smart phone case, according to an embodiment of the present invention.

Referring to FIG. 3, a user protection method in accordance with the present invention includes installing a screen-lock application and a reporting application in a smart phone, and setting an option, in step S200; running the reporting application through the screen-lock application, in step S400; sending report data to a predetermined server, in step S600; and sending an address of a website linked to the report data and information about a location of the smart phone to a predetermined guardian's smart phone, in step S800.

First, in step S200, the screen-lock application driven with electric signals of at least one of the fingerprint recognition sensor and the case of the smart phone, and the reporting application running in conjunction with the screen-lock application are installed, and a predetermined option is set.

The applications have the same format as applications installed in ordinary smart phones, and are easily accessed by the user by being provided in an operating system (OS) or in a market provided by a telecommunication carrier.

Furthermore, through the option settings of the screen-lock application, fingerprints of the user may be registered, and specifically, multiple fingerprints may be separately registered for each function. In other words, a fingerprint may be registered only for unlocking the smart phone, and another fingerprint may further be registered for running the reporting application.

Moreover, a safety phone number to which a text message notifying of an emergency situation is to be sent may be registered through the option settings of the reporting application, and at this time, personal information such as name, age, address, photo, etc., of the smart phone owner (or the user of the smart phone) required to report the emergency situation may be registered.

Furthermore, at least one rescue request voice may be registered in step S220 by activating a microphone of the smart phone through the option settings to identifiably record the voice of the user of the smart phone. This is to run the reporting application by making the registered rescue request voice in a situation where it is difficult to activate the fingerprint recognition function or the protection function of the case in step S400, as will be described below.

Next, in step S400, if a registered fingerprint is recognized in the fingerprint recognition sensor of the smart phone, or if the smart phone receives an electric signal generated by the case, the smart phone is unlocked through the screen-lock application and simultaneously runs the reporting application.

In this regard, the case may be equipped with a self-protection module having at least one self-protection function among a Taser and gas spraying, and when the self-protection module is activated to perform the self-protection function, an electric signal is generated in the case and sent for the smart phone to run the reporting application.

In addition, when the rescue request voice as described in step S200 is recognized through the microphone of the smart phone, the smart phone is unlocked through the screen-lock application regardless of whether the fingerprint was recognized or the electric signal was received, and simultaneously, runs the reporting application.

Therefore, the smart phone may automatically call for rescue by recognition of the rescue request voice or by use of the electric signal generated by the fingerprint recognition sensor or the case of the smart phone without performing any noticeable behavior or multi-stage operation in an emergency situation, and may protect and defend the user using the case with the self-protection function.

Meanwhile, the case with a self-protection function may have identical or similar features to what is disclosed in the Korean Patent No. 10-1487269 entitled as 'Case of Portable Terminal Equipped with Taser Function'. Accordingly, details of the features or operation principle of the case equipped with the self-protection module will be omitted herein.

When the reporting application is running in step S400, Wi-Fi®, Bluetooth®, Global Positioning System (GPS), and/or mobile communication data network of the smart phone may be compulsorily executed for a server to track the position of the smart phone.

Information about the position detected over at least one of the Wi-Fi®, Bluetooth®, GPS, and mobile communication data network that may be accessible may be sent to the server at regular intervals, and the information may be used in rescue activities by being tracked in real time and sent to a guardian or an agency when the user of the smart phone is in an emergency situation.

The camera and microphone of the smart phone may be activated for a certain period of time after the reporting application has been activated, and during the certain period of time, it is determined whether to stop the reporting application, in step S500. Accordingly, even if the user inadvertently runs the reporting application, the user is allowed to select whether to stop the reporting application during the certain period of time, thereby preventing a rescue-call function from indiscreetly coming into effect.

Next, in step S600, report data created by capturing and recording the situation in the field through the camera and microphone of the smart phone that work in conjunction with the reporting application is sent to a designated server.

In this regard, the camera and microphone are not manually manipulated, but may perform capturing and recording functions by being automatically activated according to an algorithm of the reporting application.

This may help to figure out what situation the user of the smart phone is under and to deal with the situation from the report data about the emergency situation, and may also enable reliable analysis on the report data recorded in video and sound to determine whether the emergency situation is genuine even if the reporting application inadvertently continues to run and thus the rescue call is accepted by an agency, thereby preventing unnecessary mobilization for rescue.

The method may further include step S720 of generating a detection signal measured from at least one of acceleration sensor, gyro sensor, illumination sensor, touch sensor, and approximation sensor of the smart phone in real time and sending the detection signal to the reporting application, and step S740 of sending a designated terminal time-series pattern data derived by analyzing the detection signal sent to the server in real time.

In other words, if the report data has not been correctly generated, or a part of the report data to be checked is unclear, the emergency situation in which the user of the smart phone is involved inferred by analyzing the detection signal. In addition, even a situation where the user of the smart phone is confined or moving in a vehicle may be inferred using the detection signal. Therefore, the detection signal may be usefully used in a rescue activity.

The acceleration sensor measures acceleration of the smart phone or intensity of shocks. The output signal of the acceleration sensor is processed to determine mechanical force such as acceleration, vibration, and shock of the smart phone. Accordingly, the acceleration sensor detects instantaneous acceleration, vibration, shock, or the like, which are stored as time-series pattern data and sent to the server.

The gyro sensor is a concept that uses dynamics of a rotating smart phone, and is used in measuring the position and setting up the orientation. Accordingly, the gyro sensor detects rotation of the smart phone, which is stored as time-series pattern data and sent to the server.

The illumination sensor measures an amount of ambient light around the smart phone, and operation of the smart phone may be controlled according to the measured amount of ambient light. Accordingly, the illumination sensor detects an amount of ambient light around the smart phone, which is stored as time-series pattern data and sent to the server.

The touch sensor detects contact with a human body, which unlocks the smart phone or activates certain functions of the smart phone. Accordingly, even when the smart phone is put in the user's pocket or bag, the user may be able to touch the device in a pattern preset by the user, and to send a designated rescue signal to a server.

The approximation sensor detects whether an object is present, passing, flowing, etc., without physical contact, and location of the object may be used to control various functions of the phone. Accordingly, a short-range detection function of the approximation sensor may be used to send a rescue signal. For example, if it is detected that the approximation sensor operates more than predetermined number of times in a predetermined period of time, a rescue signal stored in advance may be sent to the server.

Furthermore, the server may remotely control the smart phone from which an emergency situation is reported, to activate the camera or many different sensors of the smart phone. In this regard, a remote-control application may further be installed in the smart phone, and enables the smart phone to be remotely controlled after completing user authentication or permitting the server to compulsorily control the smart phone. Accordingly, even if the camera, microphone, and various sensors are not correctly operating in certain situations, they may be remotely controlled to be re-executed to figure out a situation around the smart phone.

Next, in step S800, the server links the report data to a predetermined website, converts the address of the website and the position information of the smart phone into a text message format, and sends them to a designated guardian's smart phone.

The guardian may then immediately recognize the emergency situation. Especially, the guardian may be allowed to immediately check the linked report data and thus may easily grasp the situation. Furthermore, the guardian may check the position information of the smart phone from which the emergency situation is reported, and may quickly go to the corresponding spot. The position information may be represented in coordinates of a location or text of an address, and may of course be engaged with a separate map application, thereby allowing a more exact position to be determined.

In this regard, the method may further include step S900 of sending an urgent rescue signal based on the report data received by the server to a terminal of a call center of a designated private security company or national emergency assistance agency. Accordingly, a professional and swift rescue activity may be prompted.

Figure 4:
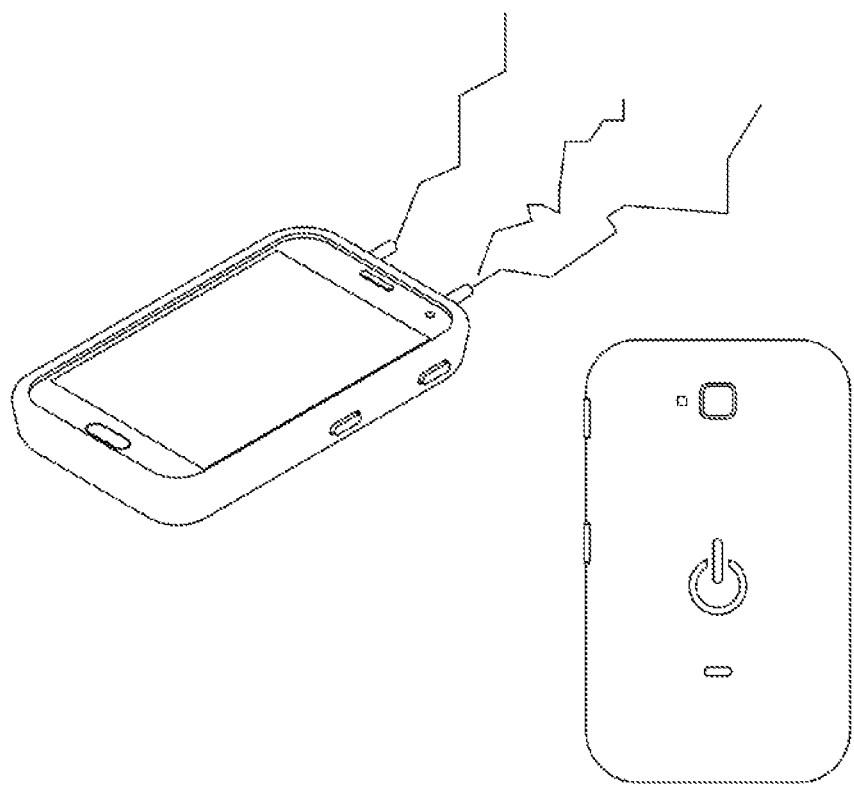
FIG. 4 is a view for explaining an example to be added in the present invention.

FIG. 4 is a view for explaining an example to be added in the present invention.

Referring to FIG. 4, a case equipped with a Taser function is shown. The case generates a voltage of about 60,000V or less through a projected high-voltage spike terminal. This Taser function may threaten the attacker by emitting Taser sparks and an electrical explosion sound.

Figure 5:
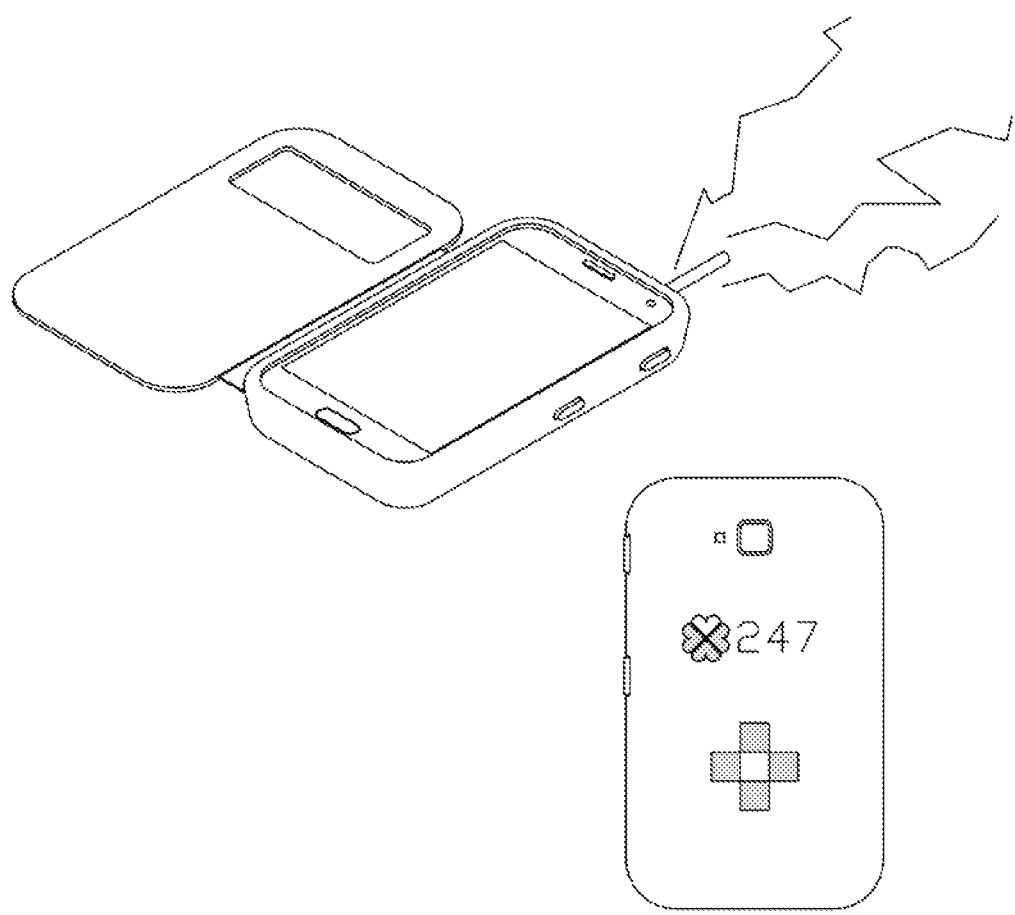
FIG. 5 is a view for explaining another example to be added in the present invention.

FIG. 5 is a view for explaining another example to be added in the present invention.

Referring to FIG. 5, a case equipped with a long-distance Taser function is shown. The case has a tri-fold projection, which enables the long-distance Taser function to be used even when the case is a certain distance e.g., about 10 cm to 20 cm away from the opponent.

Figure 6:
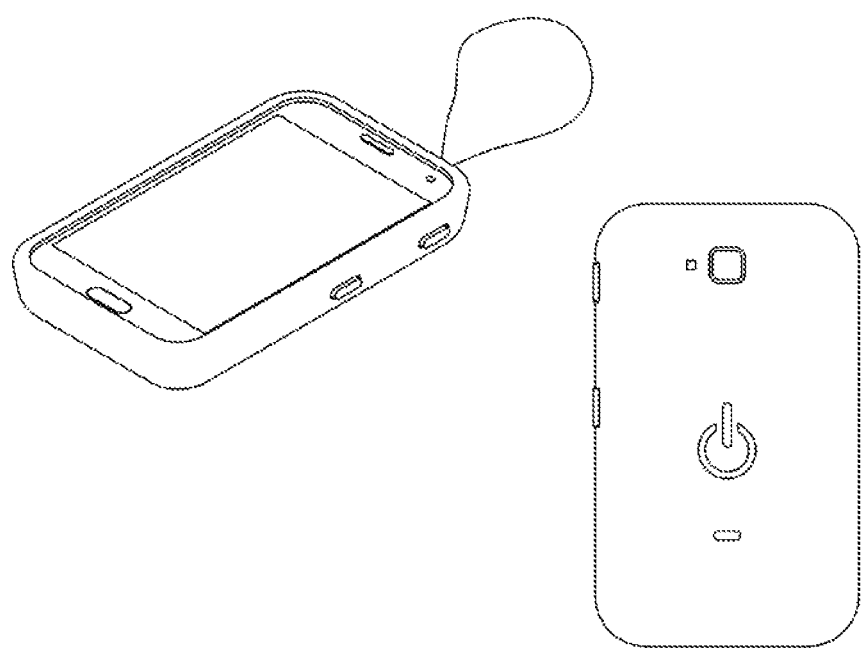
FIG. 6 is a view for explaining another example to be added in the present invention.

FIG. 6 is a view for explaining another example to be added in the present invention.

Referring to FIG. 6, a case equipped with a long-distance gas spray function is shown. With the long-distance gas spray function, the user may deter the attacker by spraying gas toward the face of the attacker.

Figure 7:
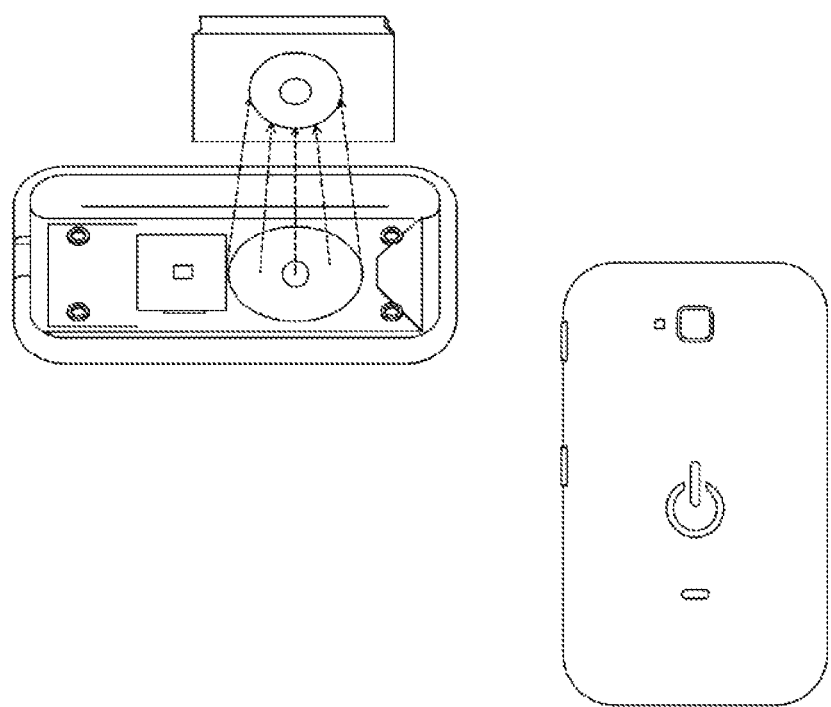
FIG. 7 is a view for explaining another example to be added in the present invention.

FIG. 7 is a view for explaining another example to be added in the present invention.

Referring to FIG. 7, a case equipped with an inductive charging function is shown. With the inductive charging function, the smart phone may be charged in a self-inductive way.

According to the embodiments of the present invention, an electric signal generated from a smart phone case or a fingerprint recognition sensor in the smart phone may be used to automatically make rescue calls in an emergency situation without a user performing a noticeable behavior or multi-stage operation, and the smart phone case with a self-protection function may be used to directly protect and defend the user him/herself.

Furthermore, even if the user inadvertently runs a reporting application, it is allowed for the user to select whether to stop the reporting application within a certain period of time, thereby preventing a report function from indiscreetly coming into effect.

Even if the reporting application inadvertently continues to run and the rescue call is accepted by an agency, the rescue call data recorded in video and sound may be analyzed to determine whether the call is a genuine emergency, thereby preventing unnecessary mobilization for rescue.

It will thus be understood that various modifications can be made without departing the scope of the present invention. Thus, it will be apparent to those ordinary skilled in the art that the disclosure is not limited to the embodiments described, but can encompass not only the appended claims but the equivalents. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A user protection method using a smart phone case, the smart phone case covering a rear face of a main body of a smart phone to protect the main body from external shocks and being electrically coupled with hardware of the smart phone, and the method using an application that runs based on a preset electric signal to perform at least one of a rescue call function and a self-protection function in an emergency situation to protect a user of the smart phone, the method comprising:

installing a screen-lock application driven with electric signals of the smart phone case of the smart phone and a reporting application running in conjunction with the screen-lock application, and setting a predetermined option unlocking the smart phone through the screen-lock application and simultaneously running the reporting application, if the smart phone receives an electric signal generated by the smart phone case sending a designated server report data created by capturing and recording a field situation through a camera and microphone of the smart phone that work in conjunction with the reporting application; and linking the report data to a predetermined website, converting an address of the predetermined website and position information of the smart phone into text message formats, and sending the conversion results to a designated guardian's smart phone, with the linking, converting, and sending being performed by the server;

wherein the smart phone case is equipped with a self-protection module having at least one self-protection function, and when the self-protection module is activated to perform the self-protection function, an electrical signal is generated in the smart phone case and sent to the smart phone to run the reporting application.

2. The user protection method using a smart phone case of claim 1, wherein the self-protection module has at least one self-protection function among a Taser and gas spraying, and wherein if the self-protection module is activated to perform the self-protection function, a voltage less than 60000 volts is generated by the smart phone case at a projected high-voltage spike terminal of the smart phone case.

3. The user protection method using a smart phone case of claim 1, further comprising:
    if the reporting application is running, compulsorily executing Wi-Fi®, Bluetooth®, GPS, and mobile communication data network of the smart phone.

4. The user protection method using a smart phone case of claim 3, further comprising: sending position information detected using at least one of Wi-Fi®, Bluetooth®, GPS, and mobile communication data network to the server at regular intervals.

5. The user protection method using a smart phone case of claim 1, further comprising:
    after unlocking the smart phone and running the reporting application,
    activating the camera and microphone of the smart phone for a certain period of time after the reporting application has been activated; and
    determining whether to stop the reporting application during the certain period of time.

6. The user protection method using a smart phone case of claim 1, further comprising:
    after unlocking the smart phone and running the reporting application,
    generating a real-time detection signal measured from at least one of an acceleration sensor, a gyro sensor, an illumination sensor, a touch sensor, and an approximation sensor of the smart phone and sending the detection signal to the server through the reporting application; and
    sending a designated terminal time-series pattern data derived by analyzing the real-time detection signal sent to the server.

7. The user protection method using a smart phone case of claim 1, further comprising: sending an urgent rescue signal based on the report data received by the server to a terminal of a call center of a designated private security company or national emergency assistance agency.

8. The user protection method using a smart phone case of claim 1, further comprising:
    registering at least one rescue request voice by activating a microphone of the smart phone through the option setting to identifiably record the voice of the user of the smart phone,
    wherein if the rescue request voice is recognized through the microphone of the smart phone, the smart phone is unlocked through the screen-lock application regardless of an electric signal was received, and simultaneously, runs the reporting application.

* * * * *